United States Patent [19]
Cooper et al.

[11] Patent Number: 5,224,645
[45] Date of Patent: Jul. 6, 1993

[54] DIFFUSION BONDING OF ALUMINUM AND ALUMINUM ALLOYS

[75] Inventors: Graham A. Cooper; Ian E. Bottomley, both of Preston, United Kingdom

[73] Assignee: British Aerospace PLC, London, United Kingdom

[21] Appl. No.: 525,399

[22] Filed: May 18, 1990

[30] Foreign Application Priority Data

May 19, 1989 [GB] United Kingdom ............... 8911599

[51] Int. Cl.$^5$ ...................... B23K 20/00; B23K 31/02
[52] U.S. Cl. ................................ 228/157; 228/175; 228/190
[58] Field of Search ............ 228/157, 265, 175, 190, 228/181, 205, 206, 199, 263.17, 193

[56] References Cited

U.S. PATENT DOCUMENTS

| | | | |
|---|---|---|---|
| 3,937,387 | 2/1976 | Fletcher et al. | 228/206 |
| 3,980,220 | 9/1976 | Wolfe et al. | 228/175 |
| 4,220,276 | 9/1980 | Weisert et al. | 228/118 |
| 4,295,255 | 10/1981 | Weber | 228/157 |
| 4,351,470 | 9/1982 | Swadling et al. | 228/157 |
| 4,426,032 | 1/1984 | Leodolter | 228/157 |
| 4,454,977 | 6/1984 | Aldinger et al. | 228/175 |
| 4,549,685 | 10/1985 | Paez | 228/157 |
| 4,695,699 | 9/1987 | Yagii et al. | 228/193 |
| 4,732,312 | 3/1988 | Kennedy et al. | 228/263.17 |
| 4,948,457 | 8/1990 | Cooper et al. | 228/196 |

FOREIGN PATENT DOCUMENTS

| | | |
|---|---|---|
| 0022605 | 3/1980 | European Pat. Off. |
| 0068569 | 2/1982 | European Pat. Off. |
| 0350220 | 3/1989 | European Pat. Off. |
| 1486979 | 9/1977 | United Kingdom |

OTHER PUBLICATIONS

Metals Handbook Ninth Edition, vol. 6, "Solid State Welding", pp. 672-691, copyright 1983.
Welding Research Council Bulletin, "A Review of Diffusion Welding", Gerken and Owczarski, Oct. 1965.
Metals Handbook Ninth Edition, vol. 5, pp. 83-96, "Abrasive Blast Cleaning", copyright 1982.
The Application of Diffusion Bonding and Laser Welding in the Fabrication of Aerospace Structures; S. B. Dunkerton & C. J. Dawes; Sep. 1985.
Low Temperature Diffusion Bonding of Aluminum Alloys; I. M. Barton, Jun. 1964; p. 241.
Fundamentals of Solid State Welding and Their Application to Beryllium, Aluminum and Stainless Steel; D. Hauser et al, Jul. 1965; p. 74—onwards.

*Primary Examiner*—Samuel M. Heinrich
*Attorney, Agent, or Firm*—Kerkam, Stowell, Kondracki & Clarke

[57] ABSTRACT

A process is described of forming a diffusion bonded article from components made of aluminum or an alloy thereof that forms a protective coating of an oxide that inhibits such bonding. The process comprises removing the oxide layer and immediately forming the components into a stack, placing the stack in the chamber of an electron beam welding device, evacuating the chamber and electron beam welding the edge regions of the stack; the welded stack can then be diffusion bonded at leisure without the oxide re-forming. The diffusion bonded article can be superplastically formed to a finished or semi-finished shape.

9 Claims, 2 Drawing Sheets

DIFFUSION BONDING OF ALUMINUM AND ALUMINUM ALLOYS

TECHNICAL FIELD

The present invention relates to a technique of diffusion bonding aluminum and aluminum alloys to form a composite structure that can subsequently be subjected to superplastic forming.

BACKGROUND ART

Diffusion bonding is an extremely valuable technique in joining components, particularly in the aircraft industry and involves the pressing together of heated components so that the atoms in the components interdiffuse to form a metal-to-metal bond. Diffusion bonding can in the case of certain metals having a specific uniform grain structure (e.g. titanium) be combined with superplastic forming, which is a technique in which a metal article, usually in sheet form, is heated and subjected to slow deformation during which the metal stretches and is thinned out in the deformed areas but does not neck or fracture and in this way the metal article can be formed into a desired shape.

Aluminum and many of its alloys can be formed superplastically but they have an extremely tenacious surface oxide that prevents diffusion bonding; because of the physical properties of aluminum (low density and high strength), it is ideal for use in the aircraft industry but its inability to be formed into a composite structure by diffusion bonding has caused design limitations. The term "aluminum" will be used in this Specification to include both aluminum and aluminum alloys.

In our earlier British Patent Application No. 8815663.3 (corresponding to EP-A-0 350 220, U.S. Ser. No. 373,492 now U.S. Pat. No. 4,948,457), we described a method of diffusion bonding a component made of aluminum to a further component (which may also be made of aluminum) by subjecting the aluminum component(s) to grit blasting and to a chemical treatment to remove the oxide layer followed by assembling the components into a stack (or pack) in which the components are positioned in the configuration desired for the final diffusion-bonded article, and finally diffusion bonding the assembled stack at a temperature preferably of 540° to 580° C. for two to five hours. The diffusion bonding step is performed by placing the components to be joined (which are usually sheets) in a cavity, placing a superplastic membrane over the cavity, compressing the edges of the membrane against the cavity wall so as to seal the cavity, applying a gas pressure on the side of the membrane facing away from the cavity and simultaneously evacuating the cavity, whereby the differential pressure across the membrane compresses the components in the cavity. The components are heated to 540° to 580° C. which together with the pressure exerted on the components as a result of the pressure differential across the membrane causes the desired diffusion bond to be formed between the components. It is necessary to evacuate the cavity during diffusion bonding, e.g. to a pressure of $10^{-6}$ mbar, in order to prevent the oxide layer on the aluminum component from reforming to such an extent that it blocks diffusion of the metal atoms and hence prevents diffusion bonding; the formation of some oxide is inevitable but if it is limited then the resulting diffusion bonding can have adequate strength; we have found that it is necessary, if the bond is to have an acceptable strength, for the diffusion bonding to be performed within about 20 minutes of the grit blasting/chemical treatment step.

The technique described above has a number of drawbacks:

(1) High vacuum levels are required for successful diffusion bonding and this means that the membrane must provide an excellent seal and also the vacuum pumping equipment must be of a very high quality in order to ensure that an adequate vacuum is maintained within the cavity. Whereas this can be adequately achieved on a laboratory-scale, it is extremely difficult and expensive to achieve on an industrial-scale, (2) Since the cleaned surfaces of the aluminum component can only be exposed to air for a maximum of 20 minutes, the assembly of the stack and the evacuation of the cavity must be carried out within this period; as will be appreciated, this is a difficult task to perform, particularly on an industrial scale, and (3) The monitoring of the pressure within the cavity is extremely difficult and it is possible to trap pockets of air between sheets of material to be bonded together and such air pockets contaminate the surfaces being bonded.

We have now discovered a technique whereby the above disadvantages can be overcome or at least reduced.

EP-A-0 022 605 and EP-A-0 058 569 both describe methods of bonding dissimilar metals to each other by subjecting them to extensive working to form a composite article with an exterior layer of a corrosion-resistant material on top of a base material providing strength to the article and/or different corrosion resistance. Examples given in EP-A-0 022 605 are of making tube or sheet having a base of ordinary steel and an exterior covering layer of stainless steel. Prior to the working step the layers of dissimilar metals are welded by electron beam welds primarily to prevent the layers from exfoliating during the working step but also to prevent oxygen from contacting the interface between the layers during hot working which would if present inhibit the formation of the bond between the layers.

DISCLOSURE OF THE INVENTION

According to the present invention, there is provided a process of diffusion bonding metallic components, which are preferably in sheet-form, and which are made of aluminum or an aluminum alloy that is liable to form a surface coating of oxide, which process comprises removing the oxide surface coating from the aluminum components in predetermined areas that are to be bonded, assembling the components to form a stack, placing the stack in the chamber of an electron beam welding apparatus, evacuating the chamber, welding the edge regions of the components in the stack together by electron beam welding, removing the welded stack from the chamber and subsequently subjecting the stack to a diffusion bonding step in which the components are bonded together in the said predetermined areas; the diffusion bonded stack is preferably then superplastically formed to a desired shape.

The present invention has the advantages that the welded stack of components can be diffusion bonded without simultaneous application of a vacuum to the stack and that the interval between the cleaning of the aluminum components to remove the surface oxide and the diffusion bonding can be greatly extended to periods of the order of hours or days without reducing the bond strength to an unacceptable level. Also, the present invention provides better process reproducibility than the process described in the above British Patent Application.

The evacuation of the vacuum chamber of an electron beam welding apparatus is relatively straight-forward and is far simpler than evacuation of the cavity of the diffusion bonding apparatus described in British Patent Application 8815663.3 since the seals on the latter apparatus must be gas tight at all temperatures from room temperature to 560° C. and hence the seals and evacuation procedures are a lot more complicated than in an electron beam welding chamber where the seals have to be gas tight over a much smaller temperature range. Furthermore, the evacuation time of the electron beam chamber is shorter than for the cavity of the diffusion bonding apparatus because of the relative simplicity of the electron beam welding chamber over the diffusion bonding apparatus and because the diffusion bonding apparatus usually contains several stacks of components to be diffusion bonded together and therefore requires a long evacuation time and this leads to a further advantage of the present invention in that it is far easier to achieve the electron beam welding within about 20 minutes of the oxide removal stage than it is to evacuate the chamber of the diffusion bonding apparatus within this time, which as stated above is required to prevent oxide re-forming on the cleaned surfaces which would block subsequent diffusion bonding.

It is preferred that the oxide layer is removed by the process described in British Patent Application No. 8815663.3, that is to say by subjecting the component(s) made of aluminum (or other oxidisable metal) to an acid etch or a de-oxidising solution, then grit blasting them followed by a chemical treatment to remove remaining oxide.

The diffusion bonding can be performed with, but preferably is performed without, the simultaneous working of the components. The diffusion bonding can simply be performed as described in British Patent Application No. 8815663.3 (except that it is no longer necessary to apply a vacuum to the components during diffusion bonding), that is to say the components in the assembled and welded stack are compressed at a temperature of 540° to 580° C. for two to five hours. Alternatively, the diffusion bonding step may be performed in a heated press, e.g. in a hot isostatic press. Hot isostatic pressing (H.I.P.) is a well known technique in the field of powder metallurgy and involves the application of an isostatic pressure to a component while maintaining it at a required temperature. Using this technique, pressures of several thousand pounds per square inch (several million Pascals) can be achieved; furthermore, hot isostatic presses are large and it is therefore possible to place several stacks in a H.I.P. chamber at any one time so that the individual stacks of varying size can be bonded in a single batch.

BRIEF DESCRIPTION OF THE DRAWINGS

A process of the present invention will now be described in further detail with reference to the accompanying drawings in which.

BEST MODE OF PERFORMING THE INVENTION

Figure 1:
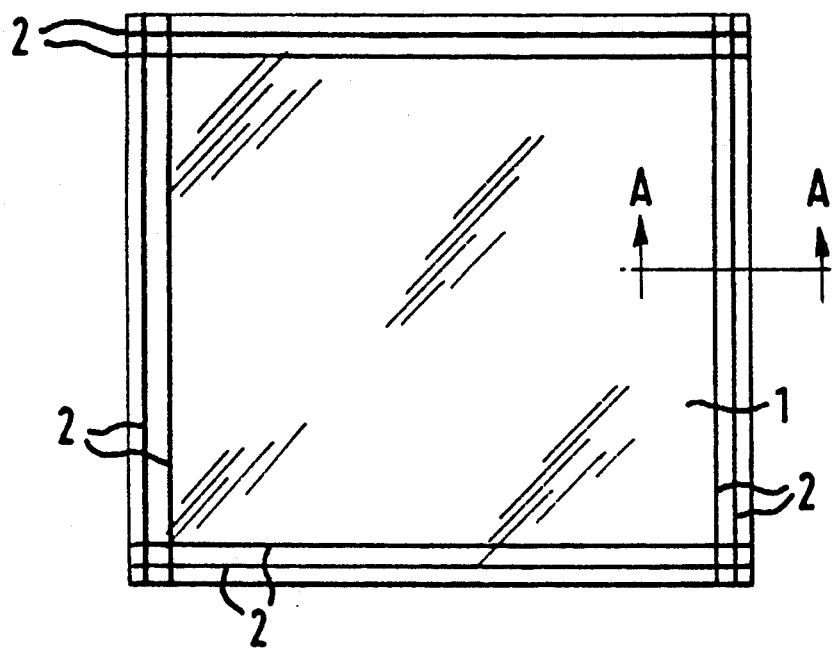
FIG. 1 is a plan view of two sheets that have been welded together to form a stack.
Figure 2:
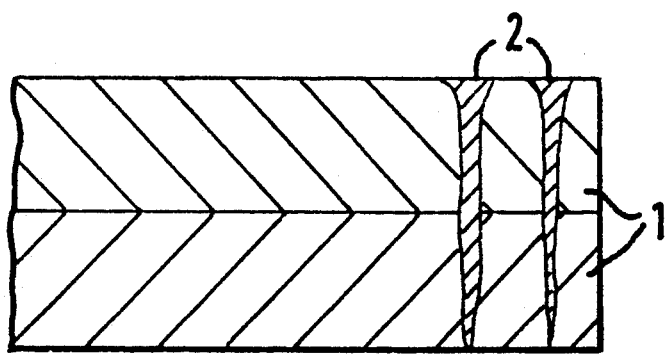
FIG. 2 is an enlarged sectional view through line A—A of FIG. 1.
Figure 3:
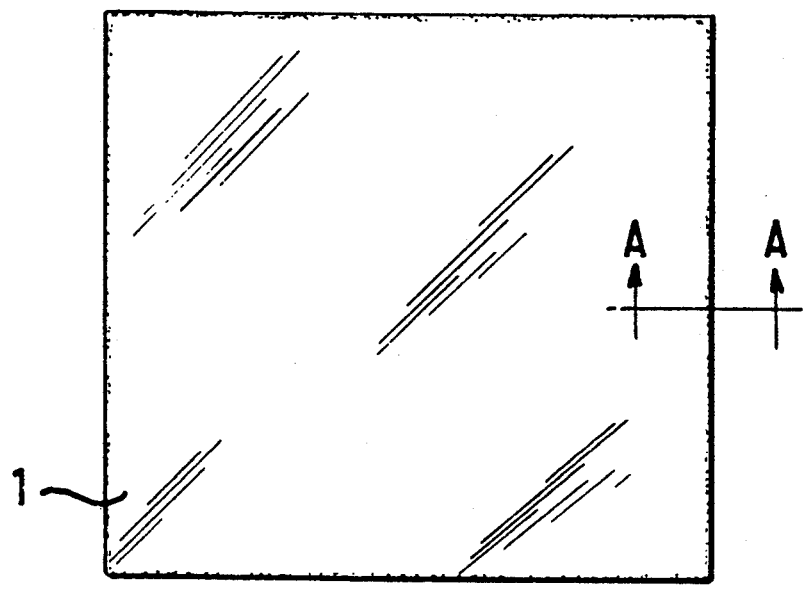
FIG. 3 is a view of a stack of sheets that have been welded together by a different technique from that shown in FIG. 1.
Figure 4:
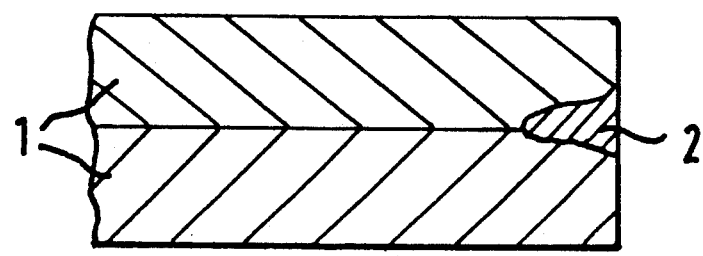
FIG. 4 is an enlarged sectional view through line A—A of FIG. 3.

In accordance with the present invention, two sheets of aluminum alloy containing 2.5% titanium are subjected to a step in which the surface layer of aluminum oxide is removed; this preferably involves treating the sheets, at least in the areas that are to be bonded, with an acid or a deoxidising solution, then grit blasting the sheets, and finally chemically treating the grit blasted areas with a deoxidising solution. Selected areas of the two sheets 1 are then treated with a stopping-off material to prevent diffusion bonding in those areas, then stacked one on top of the other in a vacuum chamber of a high energy electron beam welding apparatus with the stopping-off material between the sheets; the pressure in the vacuum chamber is then reduced to approximately $10^{-5}$ mbar (or less) and the edge regions of the sheets of the stack are welded together by electron beam welding. In accordance with one embodiment, two seam welds 2 are produced along each edge of the sheets (FIGS. 1 and 2) or the edge of the stack of sheets may be welded by welds 2 as shown in FIGS. 3 and 4. It will be apparent that other welding patterns can be used if they result in sealing the space between the two sheets. Once the sheets of the stack have been welded, the stack can be removed from the vacuum chamber and handled freely since there is now no chance of the cleaned aluminum sheets can come into contact with the ambient atmosphere, which would cause surface contamination. The resulting stacks can be diffusion bonded at leisure, e.g. using the method described in British Patent Application No. 8815663.3 (EP-A-0 350 220 and U.S. Ser. No. 373,492) but there is now no need to evacuate the cavity during bonding. The welded stack can, alternatively, be diffusion bonded using hot isostatic pressing.

It will be appreciated that more than two sheets can be diffusion bonded together in the process of the present invention.

In trials, we have discovered that the quality of the bonds produced by hot pressing the welded stacks was good even after a delay of several hours between electron beam welding and pressing.

One advantage of the present invention is that the level of vacuum in the welding chamber can be accurately controlled and there is no danger of trapping air between the sheets to be bonded. These factors help to maintain a consistent bond quality in the bonded sheets.

We claim:

1. A process of forming a structure from metallic components made of aluminum or an aluminum alloy that is liable to form a surface coating of oxide, which process comprises the steps of:

substantially removing the oxide surface coating from the aluminum or aluminum alloy components;

applying a stopping-off material to selected regions of the components, which stopping-off material prevents diffusion bonding in said selected regions during the diffusion bonding step;

assembling the components together to form a stack;

placing the stack in a chamber of an electron beam welding apparatus;

evacuating the chamber;

welding edge regions of the components together by electron beam welding;

removing the welded stack from the chamber;

subjecting the stack to a diffusion bonding step in which the components are bonded together except in said selected regions; and subjecting the thus bonded stack to superplastic forming to form the said structure by heating the stack to a temperature at which the components become superplastic, and subjecting the stack to deformation to produce the structure.

2. A process as claimed in claim 1, wherein the components are in sheet-form.

3. A process as claimed in claim 1, wherein the step of removing the oxide surface comprises subjecting the component(s) to an acid etch or to treatment with a de-oxidising solution, grit blasting the components and then treating the component(s) chemically to remove remaining oxide.

4. A process as claimed in claim 1, wherein the diffusion bonding step is performed in a heated press.

5. A process as claimed in claim 4, wherein the diffusion bonding step is performed by hot isostatic pressing.

6. A process as claimed in claim 1, wherein in the diffusion bonding step the stack is compressed by means of a membrane across which a differential pressure is maintained.

7. A process as claimed in claim 1, wherein the diffusion bonding is performed with the simultaneous working of the components.

8. A process as claimed in claim 1, wherein the diffusion bonding is performed without the simultaneous working of the components.

9. A process as claimed in claim 1, wherein the diffusion bonding is performed by compressing the components in the assembled and welded stack at a temperature of 540° to 580° C. for two to five hours.

* * * * *